US012451613B2

(12) United States Patent
Mori et al.

(10) Patent No.: US 12,451,613 B2
(45) Date of Patent: Oct. 21, 2025

(54) REFLEX REFLECTOR AND LAMP DEVICE INCLUDING THE REFLEX REFLECTOR

(71) Applicant: STANLEY ELECTRIC CO., LTD., Tokyo (JP)

(72) Inventors: Kentaro Mori, Tokyo (JP); Masayuki Kanechika, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 19/035,488

(22) Filed: Jan. 23, 2025

(65) Prior Publication Data

US 2025/0239783 A1 Jul. 24, 2025

(30) Foreign Application Priority Data

Jan. 24, 2024 (JP) ................................ 2024-009086

(51) Int. Cl.
*B60Q 1/00* (2006.01)
*F21S 45/00* (2018.01)
*H01Q 1/32* (2006.01)
*H01Q 15/14* (2006.01)

(52) U.S. Cl.
CPC ........... *H01Q 15/14* (2013.01); *B60Q 1/0023* (2013.01); *F21S 45/00* (2018.01); *H01Q 1/3208* (2013.01)

(58) Field of Classification Search
CPC ..... B60Q 1/0017; B60Q 1/0023; H01Q 15/14
See application file for complete search history.

(56) References Cited

U.S. PATENT DOCUMENTS

2022/0216616 A1* 7/2022 Kim ........................ H01Q 15/18
2022/0316678 A1* 10/2022 Maruyama .............. F21S 41/28

FOREIGN PATENT DOCUMENTS

| JP | 2010-135087 A | 6/2010 |
| JP | 5465030 B2 | 4/2014 |
| JP | 2016-212144 A | 12/2016 |
| JP | 6400062 B2 | 10/2018 |

* cited by examiner

*Primary Examiner* — Sean P Gramling
(74) *Attorney, Agent, or Firm* — KENEALY VAIDYA LLP

(57) ABSTRACT

A reflex reflector includes: a first resin layer and a second resin layer that are integrated together; a retroreflective interface that is an interface between the first resin layer and the second resin layer, and a retroreflective uneven surface, wherein a refractive index of the first resin layer is greater than a refractive index of the second resin layer; and an islands-shaped metal layer that is provided on the retroreflective interface and capable of transmitting radar wave from a radar unit, wherein a dielectric constant difference between the first resin layer and the second resin layer is within 5%.

7 Claims, 3 Drawing Sheets $$\sqrt{\varepsilon r} = \sqrt{\varepsilon r1} \frac{d1ave}{d1ave + d2ave} + \sqrt{\varepsilon r2} \frac{d1ave}{d1ave + d2ave} \quad \cdot \cdot \text{ Expression (1)}$$

here, $$d1ave = \frac{d1MAX + d1MIN}{2}$$

$$d2ave = \frac{d2MAX + d2MIN}{2}$$

REFLEX REFLECTOR AND LAMP DEVICE INCLUDING THE REFLEX REFLECTOR

The present application claims priority under 35 U.S.C. 119 to Japanese patent application no. 2024-009086 filed on Jan. 24, 2024, the content of which is incorporated herein by reference.

BACKGROUND OF THE INVENTION

1. Field of the Invention

The present invention relates to a reflex reflector for a radar and a lamp device including the reflex reflector, and in particular to the reflex reflector for a radar and a lamp device mounted on a lamp for vehicle.

2. Description of the Related Art

In recent years, various sensors such as cameras, LiDAR (Light Detection and Ranging), millimeter wave sensors, etc., in addition to acceleration sensors and GPS sensors, have been widely used for driving assistance and automatic driving.

In particular, millimeter wave radar devices are not affected by environments such as nighttime and backlight, or bad weather such as thick fog, rainfall, and snowfall, and can maintain high environmental resistance. In addition, millimeter wave radar devices can directly detect the distance and direction to an object, and the relative speed with respect to an object. Therefore, millimeter wave radar devices have an advantage of being able to detect an object at close range at high speed and with high accuracy.

For example, Patent Literature 1 discloses a lamp for vehicle provided with a shielding portion on its front cover, the shielding portion having an inner surface to which a reflex reflector is attached, the shielding portion covering a millimeter wave radar from the front. Patent Literature 2 discloses a vapor deposition type retroreflective sheet that has excellent brightness and an appearance prevented from having color unevenness.

Patent Literature 3 discloses a metal coating that is an aggregate of minute islands, and that has a metallic luster and is capable of transmitting an electromagnetic wave. Patent Literature 4 discloses a metallic lustrous member with electromagnetic wave transmissibility, including: an indium oxide-containing layer continuously provided on a surface of a substrate; and a metal layer that at least partially includes a plurality of portions in a discontinuous state and that is laminated on the indium oxide-containing layer.

CITATION LIST

Patent Literatures

Patent Literature 1: Japanese Patent Laid-Open No. 2010-135087
Patent Literature 2: Japanese Patent Laid-Open No. 2016-212144
Patent Literature 3: Japanese Patent No. 5465030
Patent Literature 4: Japanese Patent No. 6400062

However, the problem with the shielding portion as described in Japanese Patent Laid-Open No. 2010-135087 is that the dielectric constant of the front cover is different from the dielectric constant of the retroreflective sheet, so that the transmission loss of a radar wave is large. In addition, there is a demand for a member that has both brilliance and electromagnetic wave transmissibility, as a shielding member for a millimeter wave radar mounted on a front part of an automobile, such as a front grille or an emblem. Furthermore, there is a demand for a lamp device having a radar unit and a shielding member for a radar unit in which loss of a radar wave is prevented.

SUMMARY OF THE INVENTION

A reflex reflector according to an embodiment of the present invention is
a reflex reflector for use with a radar unit, the reflex reflector including:
a first resin layer and a second resin layer that are integrated together;
a retroreflective interface that is an interface between the first resin layer and the second resin layer, and a retroreflective uneven surface,
wherein a refractive index of the first resin layer is greater than a refractive index of the second resin layer; and
an islands-shaped metal layer that is provided on the retroreflective interface and capable of transmitting a radar wave from the radar unit,
wherein a dielectric constant difference between the first resin layer and the second resin layer is within 5%.

A lamp device according to another embodiment of the present invention includes:
the reflex reflector;
the radar unit placed behind a back surface of the second resin layer of the reflex reflector;
a lamp unit; and
a lamp case that houses the reflex reflector, the radar unit, and the lamp unit.

DETAILED DESCRIPTION OF THE INVENTION

Figure 1:
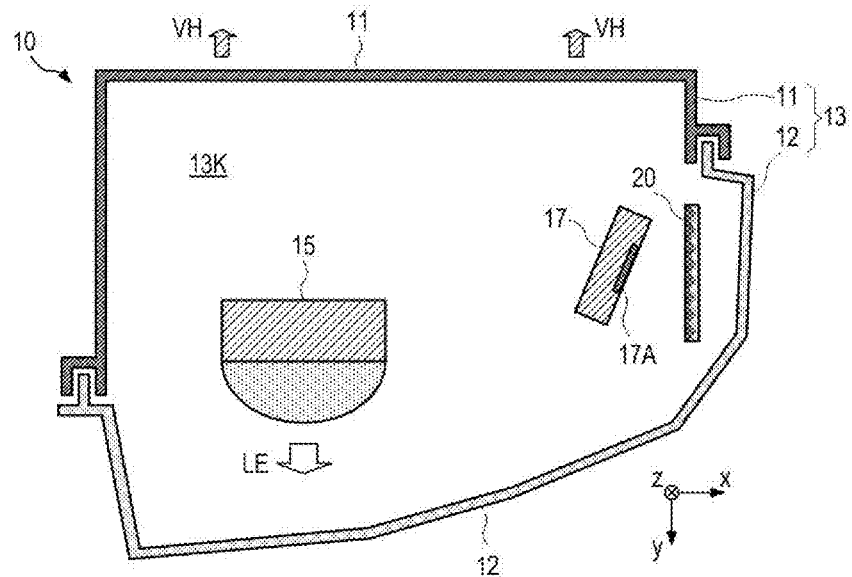
FIG. 1 is a diagram schematically showing an inside of a lamp device having a reflex reflector for a radar according to a first embodiment of the present invention.

Hereinafter, preferred embodiments of the present invention will be described, but these may be modified and combined as appropriate. In the following description and the accompanying drawings, substantially the same or equivalent parts will be described with the same reference numerals and characters.

First Embodiment

FIG. 1 is a diagram schematically showing the inside of a lamp device 10 including a reflex reflector 20 for a radar according to a first embodiment of the present invention. More specifically, the inside of the lamp device 10 is shown as viewed from the vertical direction.

Note that the figure shows a three-axis coordinate system in which the traveling direction of a vehicle VH to which the lamp device 10 is attached is a y-direction, the left direction is an x-direction, and the downward direction (gravity direction) is a z-direction. In other words, when the vehicle VH is placed horizontally, the horizontal plane is the xy plane, and the gravity direction is the z-direction.

The lamp devices 10 according to this embodiment are lamps for vehicle, and are used as headlamps arranged on the left and right sides of the front of the vehicle VH. The left and right headlamps have the same basic configuration, and the following will illustrate and describe one of the lamp devices 10 (left headlamp) arranged on the left front of the vehicle VH.

In addition, description will be made with an example of the case in which the lamp device 10 is a headlamp for main driving, but the lamp device 10 may be a lamp device having the purpose and function of emitting light toward the outside, such as a tail lamp or a reversing light.

Note that in this specification, an automobile will be described as an example of the vehicle VH, but the present invention is not limited to this. In other words, in this specification, a vehicle refers to, for example, a ship, an aircraft, or other vehicle, and manned or unmanned means of transportation or movement.

As shown in FIG. 1, the lamp device 10 is attached to the vehicle VH, and the lamp devices 10 as the left and right headlamps are configured to be symmetrical to each other.

The lamp device 10 has a lamp case 13 consisting of a housing 11 that is the base of the lamp device 10, and a transparent cover 12 (also called an outer lens or outer cover) that is attached to the housing 11 and covers the front opening of the housing 11.

The lamp device 10 has a lamp unit 15 housed in a lamp chamber (lamp space) 13K defined by the lamp case 13, and a radar unit 17.

The lamp unit 15 has a light source such as an LED and optical components such as a lens, and radiates light from the light source forward of the vehicle VH. The radiated light is referred to as radiated light LE.

The radar unit 17 is arranged to the lateral side of the lamp unit 15 within the lamp device 10. The radar unit 17 has an antenna 17A that is a radar transmitting/receiving unit that transmits an electromagnetic wave (a radar wave) and receives an electromagnetic wave reflected by an obstacle. The radar unit 17 is arranged so as to radiate a radar wave RW in the millimeter wave band toward the lateral side of the lamp device 10.

In addition, a reflex reflector 20 is arranged in the front in the direction toward which the radar unit 17 radiates the radar wave RW. However, the arrangement of the radar unit 17 and the reflex reflector 20 is not limited to this, and they can be arranged at a suitable position and angle within the lamp device 10.

(1) Structure of the Reflex Reflector

Figure 2:
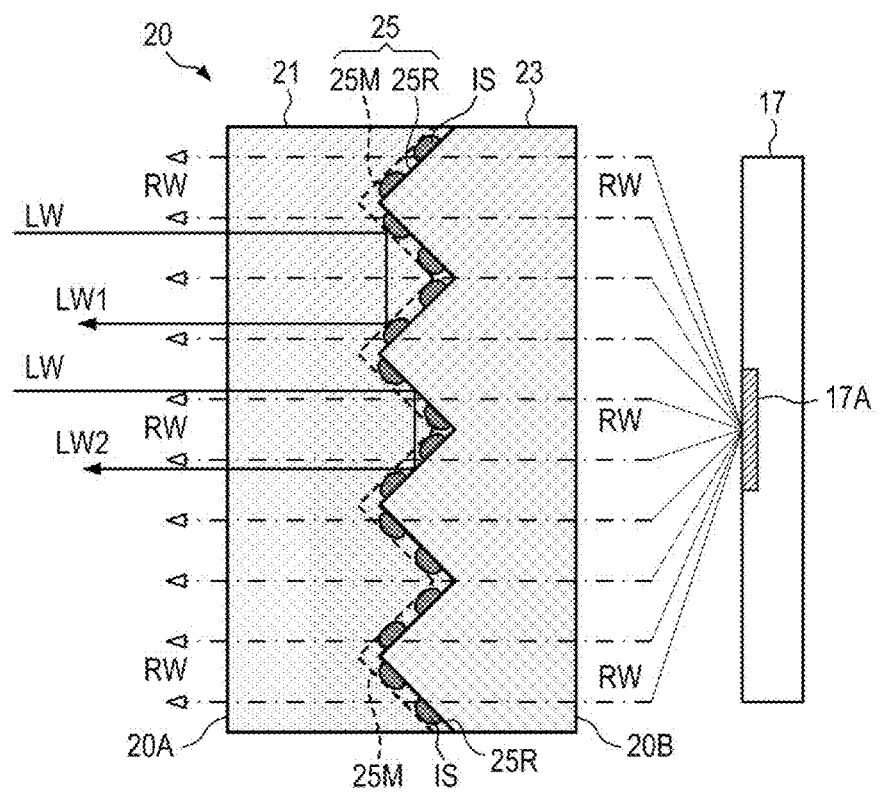
FIG. 2 is a cross-sectional view schematically showing the reflex reflector for a radar according to the first embodiment.

FIG. 2 is a cross-sectional view schematically showing a configuration of the reflex reflector 20 according to the first embodiment of the present invention.

The reflex reflector 20 is placed in front of the antenna 17A of the radar unit 17, and is arranged so that the radar wave RW of the radar unit 17 is incident onto the back surface of the reflex reflector 20. The reflex reflector 20 covers the radar unit 17 behind it, making the radar unit 17 difficult to see from the outside.

The reflex reflector 20 has a plate shape. In the reflex reflector 20, the surface 20A of the first resin layer 21 is the surface (light incident surface) on which incident light LW (external light) is incident, and the back surface 20B of the second resin layer 23 is the surface (radar wave incident surface) on which the radar wave RW of the radar unit 17 is incident. These two surfaces are both made to be surfaces without unevenness. The distance between the two surfaces, which corresponds to the plate thickness, is almost the same at every point, making them smooth surfaces.

The reflex reflector 20 is formed by integrating the first resin layer 21 and the second resin layer 23, for example, through multicolor molding. The first resin layer 21 is, for example, polycarbonate, and the second resin layer 23 is, for example, acrylic.

The first resin layer 21 and the second resin layer 23 can be selected from various thermoplastic resins such as polycarbonate resin, acrylic resin, epoxy resin, polyamide resin, and polyethylene resin.

The interface between the first resin layer 21 and the second resin layer 23 of the reflex reflector 20 is formed as a retroreflective uneven surface (hereinafter also referred to as resin interface 25R). The resin interface 25R to be used can be, for example, an interface having an uneven structure of cube corner type.

In addition, an islands-shaped metal layer 25M is formed on the first resin layer 21 side (i.e., within the first resin layer 21) on the retroreflective resin interface 25R.

More specifically, the islands-shaped metal layer 25M is an aggregate of minute islands IS, and is an electromagnetic wave transmissive coating that has a metallic luster and is capable of transmitting an electromagnetic wave. More specifically, in the islands-shaped metal layer 25M, the minute islands IS are placed so as to be separated from each other and independent, or so as to be partially adjacent to or in contact with each other within the layer.

As shown in FIG. 2, incident light LW onto the first resin layer 21 is retroreflected by the islands-shaped metal layer 25M. The retroreflected light is referred to as retroreflected light LW1.

Furthermore, in the reflex reflector 20, the refractive index n1 of the first resin layer 21 is greater than the refractive index n2 of the second resin layer 23 ($n2<n1$). As shown in FIG. 2, incident light LW onto the first resin layer 21 is also retroreflected by the retroreflective resin interface 25R. The retroreflected light is referred to as retroreflected light LW2.

In other words, although some light passes through the islands-shaped metal layer 25M, which is half-mirror transmission, the light that passes through the islands-shaped metal layer 25M is totally reflected due to the refractive index difference between the first resin layer 21 and the second resin layer 23, and is also retroreflected by the resin interface 25R. The retroreflected light is referred to as retroreflected light LW2. Therefore, a high reflectance is obtained for the incident light LW from the front of the reflex reflector 20.

As described above, the resin interface 25R and the islands-shaped metal layer 25M provide a retroreflective structure 25 with high reflectance.

On the other hand, the islands-shaped metal layer 25M is a metal coating that has minute islands IS (metal islands) placed within the layer, has a metallic luster, and is capable of transmitting a radar wave. Therefore, as shown in FIG. 2, the radar wave RW from the radar unit 17 is transmitted through the second resin layer 23, the retroreflective structure 25, and the first resin layer 21, and are radiated forward of the reflex reflector 20.

The metal of the islands-shaped metal layer 25M to be used can be, but not limited to, for example, indium, palladium, aluminum, nickel, nickel alloy, copper, copper alloy, silver, silver alloy, tin, tin alloy, etc. The islands-shaped metal layer 25M may be formed through electroless plating of these metals, etc.

Here, the islands-shaped metal layer 25M has a structure in which countless minute island-shaped metals (minute islands IS) are formed. Adjusting the size and density of the minute islands IS makes it possible to form an islands-shaped metal layer that transmits an electromagnetic wave of a desired wavelength. The size and density of the minute islands IS can be adjusted by adjusting the formation conditions (plating conditions).

In other words, when the sizes of minute islands IS (island-shaped metals) are sufficiently smaller than the wavelength of the radar wave RW, the radar wave RW is not affected by the minute islands IS and is transmitted through the islands-shaped metal layer 25M. For example, and this is merely one example, a minute island IS with a size of about several tens of nm (e.g., 20 nm) is sufficiently small compared to the wavelength of 3.9 mm of 76.5 GHz.

Therefore, even when the radar unit 17 is arranged behind the reflex reflector 20 and the radar wave RW is incident onto the back surface 20B of the reflex reflector 20, the obstacle detection function of the radar unit 17 is fully exhibited.

In other words, the reflex reflector 20 has sufficient retroreflective performance and can prevent attenuation and reflection of the radar wave RW and the reflected radar wave (i.e., the radar wave received by the radar unit 17), which does not change the electromagnetic wave radiation pattern.

In addition, the degree of freedom in arranging the radar unit 17 is increased, making it possible to apply the radar unit 17 to obstacle detection for various purposes. Furthermore, since the radar unit 17 is arranged behind the reflex reflector 20, it is difficult to see the radar unit 17 from the outside, and it is possible to hide the radar unit 17, which is also advantageous in terms of appearance.

(2) Dielectric Constant and Plate Thickness of the Reflex Reflector

The dielectric constant difference between the first resin layer 21 and the second resin layer 23 of the reflex reflector 20 causes reflection of the transmitted radar wave RW, resulting in electromagnetic wave loss. For this reason, it is preferable that the dielectric constant difference between the first resin layer 21 and the second resin layer 23 be small. Specifically, when the relative dielectric constant of the first resin layer 21 is $\varepsilon r1$ and the relative dielectric constant of the second resin layer 23 is $\varepsilon r2$, it is preferable that the relative dielectric constant difference $\Delta \varepsilon r$ is within 5%.

For example, in the case of the reflex reflector 20 described above, the relative dielectric constant $\varepsilon r1$ of the first resin layer 21 (polycarbonate) is 2.6, the relative dielectric constant $\varepsilon r2$ of the second resin layer 23 (acrylic) is 2.7, and the relative dielectric constant difference $\Delta \varepsilon r$ is 3.8%.

Figures 3A, 3B:
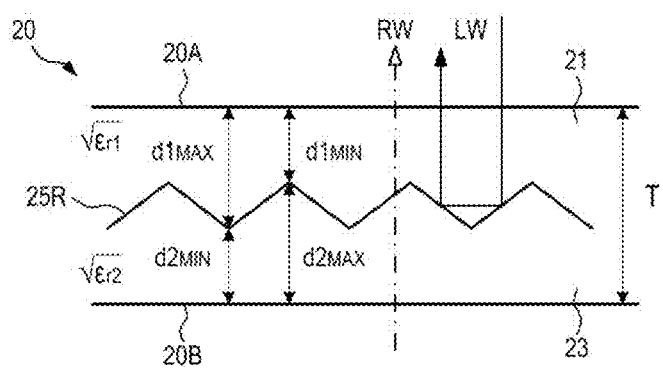
FIG. 3A is a diagram for explaining parameters to be used to calculate a composite dielectric constant of a reflex reflector.
FIG. 3B shows Expression (1) expressing a composite relative dielectric constant of a reflex reflector.

In addition, adjusting the plate thickness T of the reflex reflector 20 makes it possible to optimize the transmission characteristics of the radar wave. FIG. 3A is a diagram for explaining parameters to be used to calculate the composite dielectric constant of the reflex reflector 20.

The composite relative dielectric constant $\varepsilon r$ of the reflex reflector 20 is expressed by Expression (1) shown in FIG. 3B, where d1MAX and d1MIN are respectively the maximum distance and minimum distance between the surface 20A of the first resin layer 21 and the resin interface 25R, d2MAX and d2MIN are respectively the maximum distance and minimum distance between the back surface 20B of the second resin layer 23 and the resin interface 25R, d1ave (=(d1MAX+d1MIN)/2) is the average layer thickness of the first resin layer 21, and d2ave (=(d2MAX+d2MIN)/2) is the average layer thickness of the second resin layer 23.

At this time, the wavelength of the radar wave in the synthetic resin is $\lambda=(C/f)\times\varepsilon r^{-1/2}$, where C is the velocity of light, and f is the frequency of the radar wave in the synthetic resin.

Therefore, the plate thickness Top of the reflex reflector 20 that is optimal for transmitting a radar wave is expressed by the following Expression (2), where n is an integer equal to or greater than 1:

$$\text{Top} = (\lambda/2) \times \varepsilon r^{-1/2} \times n \qquad \text{Expression (2)}$$

Therefore, it is preferable that the plate thickness T of the reflex reflector 20 satisfy the above Expression (2) (T=Top).

In addition, the plate thickness T of the reflex reflector 20 can be formed with high accuracy through multicolor molding. Furthermore, the back surface 20B of the second resin layer 23, which is the incident surface of the radar wave RW, can be made a smooth surface.

As described above, the reflex reflector of this embodiment provides a shielding member that has both excellent brilliance and radar wave transmissibility.

In addition, the radar unit 17 and the reflex reflector 20 can be arranged at a suitable position and angle within the lamp device 10.

Second Embodiment

Figure 4:
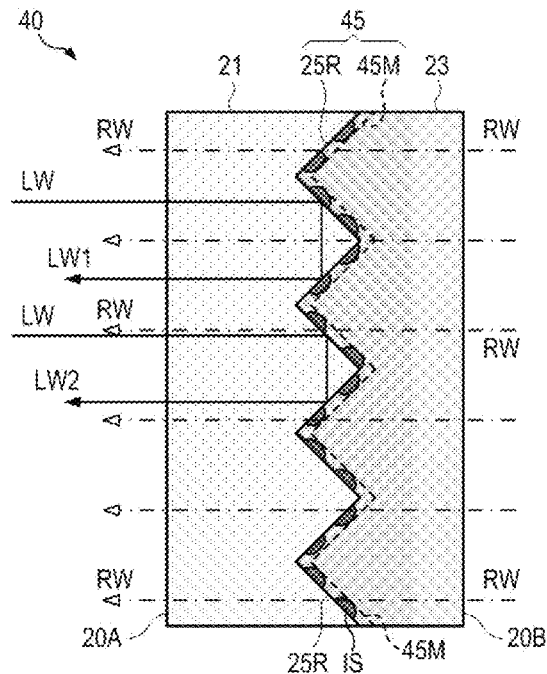
FIG. 4 is a cross-sectional view schematically showing a configuration of a reflex reflector according to a second embodiment.

FIG. 4 is a cross-sectional view schematically showing a configuration of a reflex reflector 40 according to a second embodiment of the present invention.

The reflex reflector 40 of this embodiment has a plate shape, similarly to the reflex reflector 20 of the first embodiment. The reflex reflector 40 is formed with the first resin layer 21 and the second resin layer 23 integrated together through multicolor molding.

In the reflex reflector 40, the interface between the first resin layer 21 and the second resin layer 23 is a resin interface 25R that is a retroreflective uneven surface. The resin interface 25R to be used can be, for example, an interface having an uneven structure of cube corner type.

On the retroreflective resin interface 25R, an islands-shaped metal layer 45M is formed on the second resin layer 23 side (i.e., within the second resin layer 23). The islands-shaped metal layer 45M is an electromagnetic wave transmissive coating that has a metallic luster and is capable of transmitting a radar wave RW.

As shown in FIG. 4, incident light LW onto the first resin layer 21 is retroreflected at the interface between the first resin layer 21 and the island-shaped metals of the islands-shaped metal layer 45M. The retroreflected light is referred to as retroreflected light LW1.

Furthermore, in the reflex reflector 40, the refractive index n1 of the first resin layer 21 is greater than the refractive index n2 of the second resin layer 23 ($n2<n1$). Since the incident light LW onto the first resin layer 21 is totally reflected due to the refractive index difference, the incident light LW is also retroreflected by the resin interface 25R. The retroreflected light is referred to as retroreflected light LW2.

In other words, the resin interface 25R and the islands-shaped metal layer 45M provide a retroreflective structure 45 with high reflectance.

In this embodiment, it is also preferable that the plate thickness T of the reflex reflector 40 satisfies the above Expression (2) (T=Top).

As described above, the reflex reflector of this embodiment provides a shielding member that has both excellent brilliance and radar wave transmissibility. In addition, the radar unit 17 and the reflex reflector 20 can be arranged at a suitable position and angle within the lamp device 10.

Third Embodiment

Figure 5:
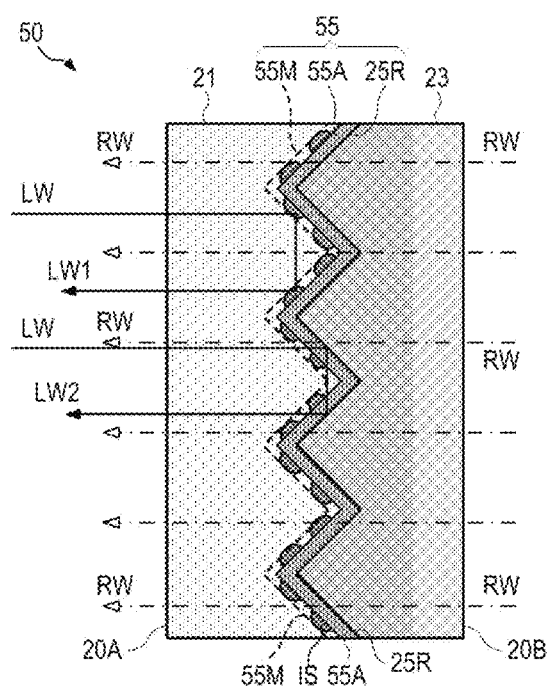
FIG. 5 is a cross-sectional view schematically showing a configuration of a reflex reflector according to a third embodiment.

FIG. 5 is a cross-sectional view schematically showing a configuration of a reflex reflector 50 according to a third embodiment of the present invention.

The reflex reflector 50 of this embodiment has a resin interface 25R that is a retroreflective uneven surface. On the resin interface 25R, on the side of the first resin layer 21, a base layer 55A is provided that is an amorphous indium tin oxide (ITO) layer. On the base layer 55A, an islands-shaped metal layer 55M is formed. The islands-shaped metal layer 55M is an electromagnetic wave transmissive coating that has a metallic luster and is capable of transmitting a radar wave RW.

As shown in FIG. 5, incident light LW onto the first resin layer 21 is retroreflected by the islands-shaped metal layer 55M. The retroreflected light is referred to as retroreflected light LW1. Incident light LW onto the first resin layer 21 is transmitted through the base layer 55A, and is totally reflected and retroreflected due to the refractive index difference between the base layer 55A and the second resin layer 23. The retroreflected light is referred to as retroreflected light LW2.

In other words, the resin interface 25R, the base layer 55A, and the islands-shaped metal layer 55M provide a retroreflective structure 55 with high reflectance.

In the reflex reflector 50, an ITO layer is provided as the base layer 55A, so that metal such as aluminum (Al) attached to the base layer 55A can be made into an islands-shaped discontinuous structure, improving electromagnetic wave transmissibility. In other words, a reflex reflector can be provided in which the electromagnetic wave transmissibility can be more easily adjusted for islands-shaped metal layers of various metals.

The base layer 55A to be used can be not only indium tin oxide (ITO) but also translucent metal oxides such as indium oxide and indium zinc oxide (IZO), or layers containing these.

Therefore, the reflex reflector of this embodiment provides a shielding member that has both excellent brilliance and radar wave transmissibility. In addition, a reflex reflector can be provided in which the electromagnetic wave transmissibility can be more easily adjusted for islands-shaped metal layers of various metals.

As described above in detail, the present invention can provide a reflex reflector that: has both excellent brilliance and radar wave transmissibility; and is mounted on a moving object such as an automobile, for example, as a front grille or an emblem. It is also possible to provide a lamp device in which a radar unit and a radar unit shielding member that prevents radar wave loss are arranged at a suitable position and angle within the lamp device.

REFERENCE SIGNS LIST

10: lamp device
15: lamp unit
17: radar unit
17A: antenna
20: reflex reflector
21: first resin layer
23: second resin layer
25, 45, 55: retroreflective structure
25M, 45M, 55M: islands-shaped metal layer
25R: resin interface (retroreflective interface)
55A: base layer
LW: incident light (external light)
RW: radar wave

The invention claimed is:

1. A reflex reflector for use with a radar unit, the reflex reflector comprising:
a first resin layer and a second resin layer that are integrated together;
a retroreflective interface that is an interface between the first resin layer and the second resin layer, and a retroreflective uneven surface,
wherein a refractive index of the first resin layer is greater than a refractive index of the second resin layer; and
an islands-shaped metal layer that is provided on the retroreflective interface and capable of transmitting a radar wave from the radar unit,
wherein a dielectric constant difference between the first resin layer and the second resin layer is within 5%.

2. The reflex reflector according to claim 1, wherein the islands-shaped metal layer is provided on the retroreflective interface on a side of the first resin layer.

3. The reflex reflector according to claim 1, wherein the islands-shaped metal layer is provided on the retroreflective interface on a side of the second resin layer.

4. The reflex reflector according to claim 1, further comprising a base layer that is provided between the retroreflective interface and the islands-shaped metal layer, and contains a metal oxide.

5. The reflex reflector according to claim 4, wherein the base layer contains indium tin oxide (ITO).

6. The reflex reflector according to claim 1, wherein a plate thickness Top of the reflex reflector satisfies:

$$\text{Top} = (\lambda/2) \times \varepsilon r^{-1/2} \times n, \quad \text{Expression (2)}$$

where $\varepsilon r$ is a composite relative dielectric constant of the reflex reflector, and n is an integer equal to or greater than 1.

7. A lamp device comprising:
a reflex reflector according to claim 1;
the radar unit placed behind a back surface of the second resin layer of the reflex reflector;
a lamp unit; and
a lamp case that houses the reflex reflector, the radar unit, and the lamp unit.

* * * * *